(12) United States Patent
Barenek et al.

(10) Patent No.: US 7,714,991 B1
(45) Date of Patent: *May 11, 2010

(54) FIBER OPTIC OPTICAL SUBASSEMBLY CONFIGURATION

(75) Inventors: Mark William Barenek, Leonardtown, MD (US); Michael J. Hackert, Lexington Park, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 45 days.

This patent is subject to a terminal disclaimer.

(21) Appl. No.: 12/255,227

(22) Filed: Oct. 21, 2008

(51) Int. Cl.
*G01N 21/00* (2006.01)
(52) U.S. Cl. ..................................... 356/73.1
(58) Field of Classification Search ........................ None
See application file for complete search history.

(56) References Cited

U.S. PATENT DOCUMENTS

| 5,287,212 | A | 2/1994 | Cox et al. |
| 6,539,136 | B1 * | 3/2003 | Dianov et al. ................. 385/12 |
| 7,009,672 | B2 * | 3/2006 | Seo et al. .................... 349/129 |
| 7,129,472 | B1 | 10/2006 | Okawa et al. |
| 2007/0025671 | A1 | 2/2007 | Shimizu et al. |

* cited by examiner

*Primary Examiner*—Tu T Nguyen
(74) *Attorney, Agent, or Firm*—Mark O. Glut

(57) ABSTRACT

A fiber optic optical subassembly configuration for monitoring fibers. The configuration includes a hollow container, a laser for emitting laser signals towards the fibers being monitored, a photodetector for monitoring reflected laser signals from the fibers being monitored and for monitoring laser output power, a beam splitter and an optical fiber. The optical fiber, disposed within the hollow container, has a coated end face surface, the laser emits signals toward and through the beam splitter, whereby a portion of the laser signal illuminates the photodetector, and another portion traverses down the optical fiber toward the coated end face surface and reflects off the coated end face surface toward the fibers that are being monitored, and reflects back from the fibers being monitored to the photodetector such that faults on the fibers can be detected.

12 Claims, 1 Drawing Sheet

Figure 1:
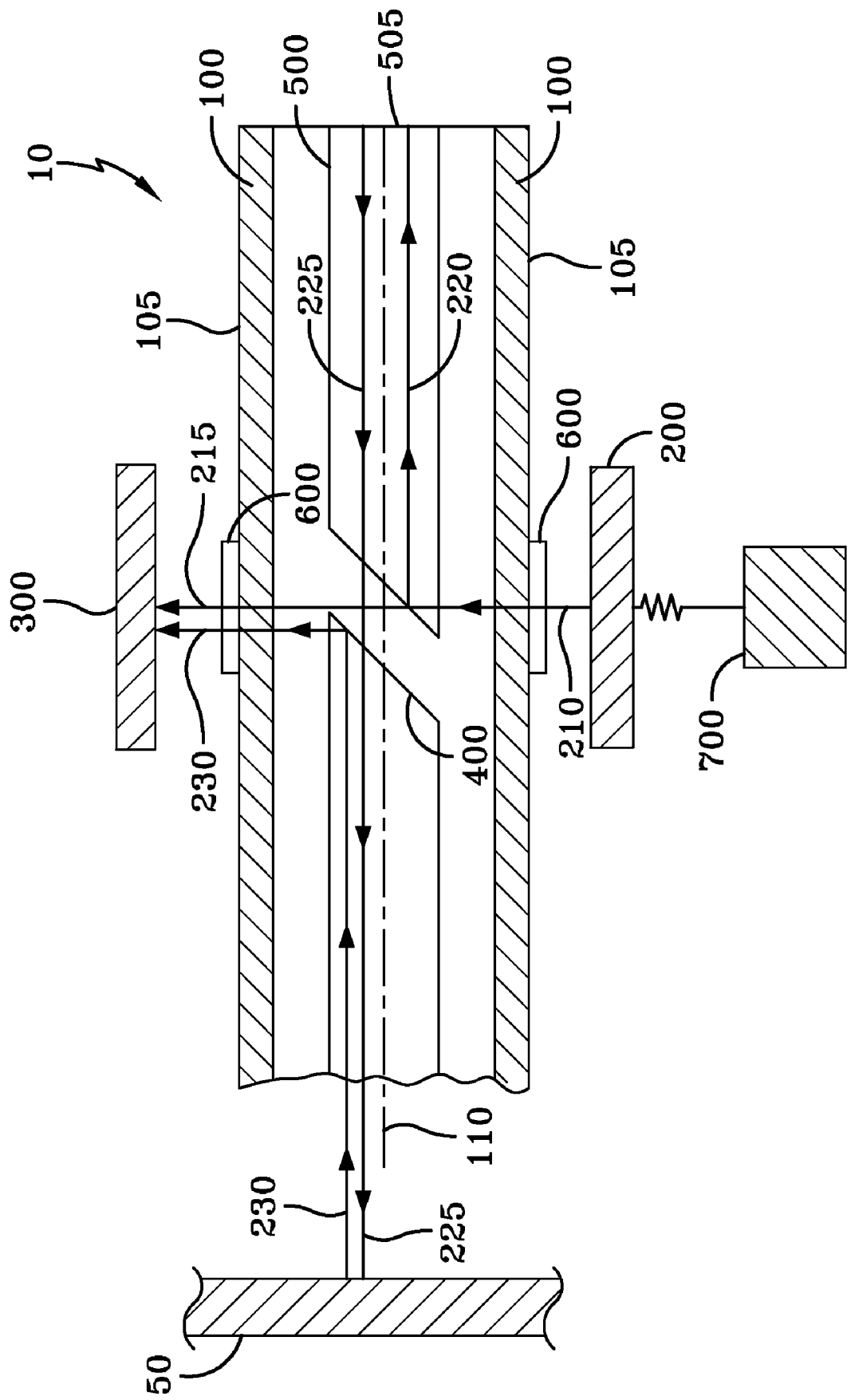

000
FIBER OPTIC OPTICAL SUBASSEMBLY CONFIGURATION

STATEMENT OF GOVERNMENT INTEREST

The invention described herein may be manufactured and used by or for the Government of the United States of America for governmental purposes without payment of any royalties thereon or therefor.

CROSS REFERENCES TO RELATED APPLICATIONS

The above listed invention is hereby cross referenced and related to U.S. patent application Ser. No. 11/789,120, filed Apr. 25, 2007, entitled "Transceiver Optical Subassembly" by inventor Mark W. Beranek; U.S. patent application Ser. No. 11/789,121, filed Apr. 25, 2007, entitled "Hybrid Fiber Optic Transceiver Optical Subassembly" by inventor Mark W. Beranek; and U.S. patent application Ser. No. 11/900,143, filed Sep. 5, 2007, entitled "Optical Bench Fiber Optic Transmitter" by inventor Mark W. Beranek. U.S. patent application Ser. Nos. 11/789,120, 11/789,121 and 11/900,143 are not admitted to be prior art with respect to the present invention. The applications are hereby incorporated by reference. All inventions are assigned to the same assignee and have a common inventor.

BACKGROUND

The present invention relates to a fiber optic optical subassembly configuration. More specifically, but without limitation, the present invention relates to a micro-optic based fiber optic beam splitter for reflectometry that can be used for monitoring fibers.

Previous methods have not enabled laser diode monitoring.

For the foregoing reasons, there is a need for monitoring the output power of the laser diode.

SUMMARY

The present invention is directed to a transmitter or subassembly that meets the needs enumerated above and below.

The present invention is directed to a fiber optic optical subassembly configuration for monitoring fibers. The configuration includes a hollow container, a laser for emitting laser signals towards the fibers being monitored, a photodetector for monitoring reflected laser signals from the fibers being monitored and for monitoring laser output power, a beam splitter and an optical fiber. The container has an axis and an outer circumference. The laser is disposed along or outside the outer circumference of the container, and the photodetector is disposed along or outside the outer circumference of the container. The photodetector is disposed in a position that is substantially diametrically opposed or opposite to the laser. The beam splitter is disposed within the container; and the optical fiber is embedded in the container and substantially parallel to the axis of the container. The optical fiber is disposed perpendicularly to the laser signal emitted by the laser. The optical fiber has a coated end face surface, the laser emits signals toward and through the beam splitter, whereby a portion of the laser signal illuminates the photodetector, and another portion traverses down the optical fiber toward the coated end face surface and reflects off the coated end face surface toward the fibers that are being monitored, and reflects back from the fibers being monitored to the photodetector such that faults on the fibers can be detected.

It is a feature of the present invention to provide a fiber optic optical subassembly configuration that allows vertical cavity surface emitting laser power monitoring and/or edge emitting laser diode power monitoring.

It is a feature of the present invention to provide a fiber optic optical subassembly configuration that can accurately locate and isolate faults in fiber optic cables and/or fiber optic transceivers.

DRAWINGS

These and other features, aspects and advantages of the present invention will become better understood with reference to the following description and appended claims, and accompanying drawing wherein:

FIG. 1 is a cross sectional view of the fiber optic optical subassembly configuration.

DESCRIPTION

The preferred embodiments of the present invention are illustrated by way of example below and in FIG. 1. As seen in FIG. 1, the fiber optic optical subassembly configuration 10 for monitoring fibers 50 includes a hollow container 100, a laser 200 for emitting laser signals towards the fibers 50 being monitored, a photodetector 300 for monitoring reflected laser signals from the fibers 50 being monitored and for monitoring laser output power, a beam splitter 400 and an optical fiber 500. The container 100 has an axis 110 and an outer circumference 105. The laser 200 is disposed along or outside the outer circumference 105 of the container 100, and the photodetector 300 is also disposed along or outside the outer circumference 105 of the container 100. The photodetector 300 is disposed in a position substantially diametrically opposed to the laser 200 (disposed opposite from each other along the outer circumference 105 of the container 100). The beam splitter 400 is disposed within the container 100 (preferably on or within the optical fiber 500); and the optical fiber 500 is embedded in the container 100 and substantially parallel to the axis 110 of the container 100. In one of the embodiments of the invention, the optical fiber 500 and the container 100 are axially aligned. The optical fiber 500 is disposed substantially perpendicular to the initial laser signal 210 emitted by the laser 200. The optical fiber 500 has a coated end face surface 505, the laser 200 emits signals 210 toward and through the beam splitter 400, whereby a portion of the laser signal illuminates the photodetector 300 (the photodetector portion signal 215), and another portion traverses down the optical fiber 500 toward the coated end face surface 505 (the coated end face surface portion signal 220) and reflects off the coated end face surface 505 along (or substantially parallel to) the axis 110 of the optical fiber 500 toward the fibers 50 that are being monitored (the reflected coated end face surface portion signal 225), and reflects back from the fibers 50 being monitored along the optical fiber 500 and via the beam splitter 400 to the photodetector 300 (the fiber reflected portion signal 230) such that faults on the fibers 50 can be detected. Micro-optic lenses 600 or any other type of lenses may be placed between the photodetector 300 and the container 100 and between the laser 200 and the container 100 to maximize light coupling efficiency between the laser 200, photodetector 300 and optical fiber 500.

In the description of the present invention, the invention will be discussed in an avionic or aircraft fiber link environment; however, this invention can be utilized for any type of need that requires use of a optical subassembly configuration. The configuration 10 may be used, but without limitations, in military operations, communications, and various other electronic uses. Additionally, the same techniques and/or subassembly described here for laser diodes can be applied to surface emitting and edge emitting LEDs, as well as other types of lasers.

The container 100 may be a cylinder, a tube, a rectangular box or any type of shape practicable. The hollow container 100 may be a container with lenses disposed at its ends. The container may be manufactured from glass or quartz or may be a cylindrical GRIN lens. A GRIN lens is, but without limitation, a lens whose material refractive index varies continuously as a function of spatial coordinates in the medium. In another embodiment of the invention, the entire container 100 may be a lens with the elements disposed within the lens itself (as described above in a GRIN lens). In another embodiment of the invention, a portion of the photodector may be swapped with a fiber.

A laser 200 may be defined, but without limitation, as a light source producing, through stimulated emission, coherent, near monochromatic light, or light amplification by stimulated emission of radiation. One embodiment of the invention includes a laser 200 that is a vertical cavity surface emitting laser (VCSEL). A vertical cavity surface emitting laser (VCSEL) is typically, but without limitation, a specialized laser diode (a laser diode, also known as an injection laser or diode laser, may be defined, but without limitation, as a semiconductor device that produces coherent radiation (in which the waves are all at the same frequency and phase) in the visible or infrared (IR) spectrum when current passes through it). The configuration 10 may also include a laser driver circuit 700. The laser driver circuit 700 provides current to the laser 200 such that the laser 200 emits signals, specifically optical signals or light.

A photodetector 300 may be defined, but without limitation, as a device capable of sensing light and converting it to electricity. The photodetector 300 may be a positive-intrinsic-negative (p-i-n) photodetector, either front illuminated or back illuminated, a metal-semiconductor-metal (MSM), or an avalanche photodiode or photodetector. However, any type of photodetector can be utilized, as practicable.

A beam splitter 400 is an optical device that splits a beam of light in two. The beam splitter 400 may be a polished plane that is angled or oblique to the axis of the optical fiber 500, and acts as a beam splitter. However, any type of conventional beam splitter may be utilized.

An optical fiber 500 may be defined, but without limitation as, a waveguide medium used to transmit information via light impulses rather than through the movement of electrons. The preferred optical fiber 500 is a multimode optical fiber transmitting in the about 800 to about 1600 nm range. The coated end face surface 505 may be defined, but without limitation, as a polished plane that is a reflective thin film material.

When introducing elements of the present invention or the preferred embodiment(s) thereof, the articles "a," "an," "the," and "said" are intended to mean there are one or more of the elements. The terms "comprising," "including," and "having" are intended to be inclusive and mean that there may be additional elements other than the listed elements.

Although the present invention has been described in considerable detail with reference to a certain preferred embodiments thereof, other embodiments are possible. Therefore, the spirit and scope of the appended claims should not be limited to the description of the preferred embodiment(s) contained herein.

What is claimed is:

1. A fiber optic optical subassembly configuration for monitoring fibers, the configuration comprising:
   a hollow container, the container having an axis and an outer circumference;
   a laser for emitting laser signals towards the fibers being monitored, the laser disposed along the outer circumference of the container;
   a photodetector for monitoring reflected laser signals from the fibers being monitored and for monitoring laser output power, the photodetector disposed along the outer circumference of the container, the photodetector substantially disposed diametrically opposite to the laser;
   a beam splitter, the beam splitter disposed within the container;
   an optical fiber, the optical fiber embedded in the container and substantially parallel to the aids of the container, the optical fiber disposed substantially perpendicular to the laser signal emitted by the laser, the optical fiber having a coated end face surface, the laser emitting signals toward and through the beam splitter, whereby a portion of the laser signal illuminates the photodetector, and another portion traversing down the optical fiber toward the coated end face surface and reflecting off the coated end face surface toward the fibers that are being monitored, and reflecting back from the fibers being monitored to the photodetector such that faults on the fibers can be detected.

2. The configuration of claim 1, wherein the container includes lenses disposed between the container and the photodetector and between the container and the laser.

3. The configuration of claim 1, wherein the laser is a vertical cavity surface emitting laser.

4. A fiber optic optical subassembly configuration for monitoring fibers, the configuration comprising:
   a lens, the lens having an axis and an outer diameter;
   a laser for emitting laser signals towards the fibers being monitored, the laser disposed along the outer diameter of the lens;
   a photodetector for monitoring reflected laser signals from the fibers being monitored and for monitoring laser output power, the photodetector disposed along the outer diameter of the lens, the photodetector disposed substantially diametrically opposite to the laser;
   a beam splitter, the beam splitter disposed within the lens;
   an optical fiber, the optical fiber embedded in the lens and substantially parallel to the axis of the lens, the optical fiber disposed perpendicularly to the laser signal emitted by the laser, the optical fiber having a coated end face surface, the laser emitting signals toward and through the beam splitter, whereby a portion of the laser signal illuminates the photodetector, and another portion traversing down the optical fiber toward the mirrored end face surface and reflecting off the coated end face surface toward the fibers that are being monitored, and reflecting back from the fibers being monitored to the photodetector such that faults on the fibers can be detected.

5. The configuration of claim 4, wherein the lens is cylindrically shaped.

6. The configuration of claim 5, wherein the lens is manufactured from glass.

7. The configuration of claim 5, wherein the lens is manufactured from quartz.

8. The configuration of claim 5, wherein the lens is a GRIN lens.

9. The configuration of claim 8, wherein the photodetector is a positive-intrinsic-negative photodetector.

10. The configuration of claim 9, wherein the configuration further includes a laser driver circuit for providing current to the laser.

11. The configuration of claim 10, wherein the laser is a vertical cavity surface emitting laser.

12. The configuration of claim 11, wherein the optical fiber is a multimode optical fiber transmitting in about the 800 to 1600 nm range.

* * * * *

UNITED STATES PATENT AND TRADEMARK OFFICE
CERTIFICATE OF CORRECTION

| | | |
|---|---|---|
| PATENT NO. | : 7,714,991 B1 | Page 1 of 1 |
| APPLICATION NO. | : 12/255227 | |
| DATED | : May 11, 2010 | |
| INVENTOR(S) | : Beranek et al. | |

It is certified that error appears in the above-identified patent and that said Letters Patent is hereby corrected as shown below:

On the Title Page:
In Item (75) inventor's name is "Mark William Beranek" not "Mark William Barenek."

Signed and Sealed this

Thirteenth Day of July, 2010

David J. Kappos
*Director of the United States Patent and Trademark Office*